US005089692A

United States Patent [19]

Tonnesson

[11] Patent Number: 5,089,692

[45] Date of Patent: Feb. 18, 1992

[54] ELECTRONIC LOCK

[75] Inventor: Thorstein Tonnesson, Moss, Norway

[73] Assignee: Trioving A.S., Moss, Norway

[21] Appl. No.: 225,757

[22] Filed: Jul. 29, 1988

[51] Int. Cl.[5] .......................... G06K 7/01; G06K 5/00

[52] U.S. Cl. ................................ 235/382.5; 235/382; 340/825.31

[58] Field of Search ..................... 235/380, 382, 382.5; 340/825.31, 825.34; 361/171, 172; 70/277, 78

[56] References Cited

U.S. PATENT DOCUMENTS

| | | | |
|---|---|---|---|
| 3,845,361 | 10/1974 | Watase et al. | 317/134 |
| 4,392,133 | 7/1983 | Lundgren | 340/825.31 |
| 4,511,946 | 4/1985 | McGahan | 361/172 |
| 4,519,228 | 5/1985 | Sornes | 235/382.5 X |
| 4,562,343 | 12/1985 | Wiik et al. | 235/382.5 |
| 4,596,985 | 6/1986 | Bongard et al. | 340/825.69 |
| 4,646,080 | 2/1987 | Genest et al. | 340/825.31 |
| 4,717,816 | 1/1988 | Raymond et al. | 235/382.5 |

*Primary Examiner*—Stuart S. Levy
*Assistant Examiner*—Tan Nguyen
*Attorney, Agent, or Firm*—Sandler, Greenblum & Bernstein

[57] ABSTRACT

The present invention relates to an individual electronic locking unit of the type which is re-coded to the code associated with a new key means and at the same time makes the previously used code invalid by the introduction of a new key means having a new code. For the purpose of obtaining a favorable solution including simplified data communication, it is according to the invention suggested that the locking unit is adapted to accept key means from a number (N) of mutually independent code sequences (C), only one key means from one of said code sequences (N·C) being valid at a time.

11 Claims, 6 Drawing Sheets

FIG. 7A
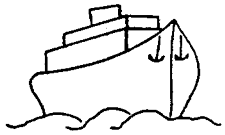
FIG. 7B
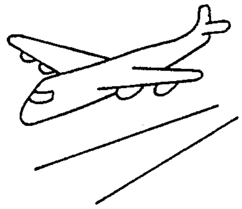
FIG. 7C
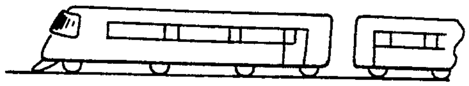
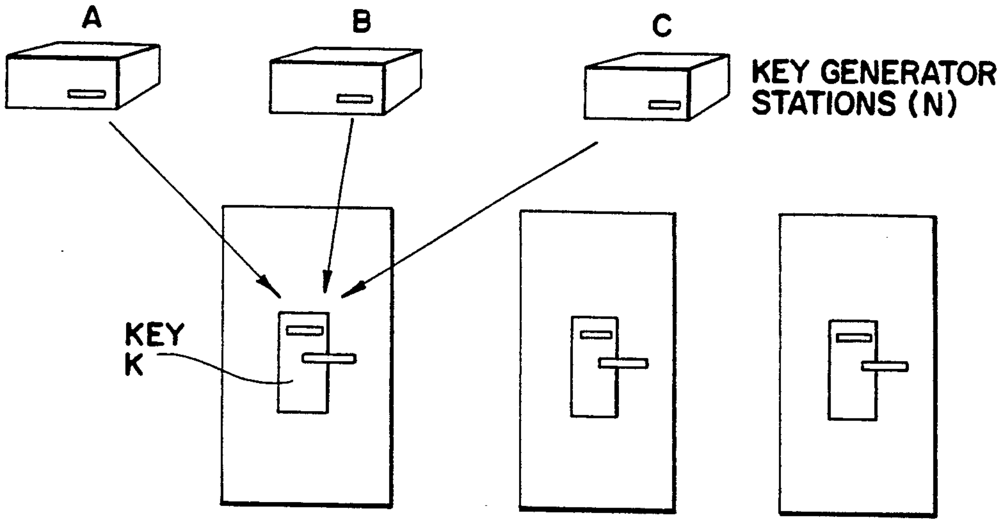
FIG. 7D
FIG. 8
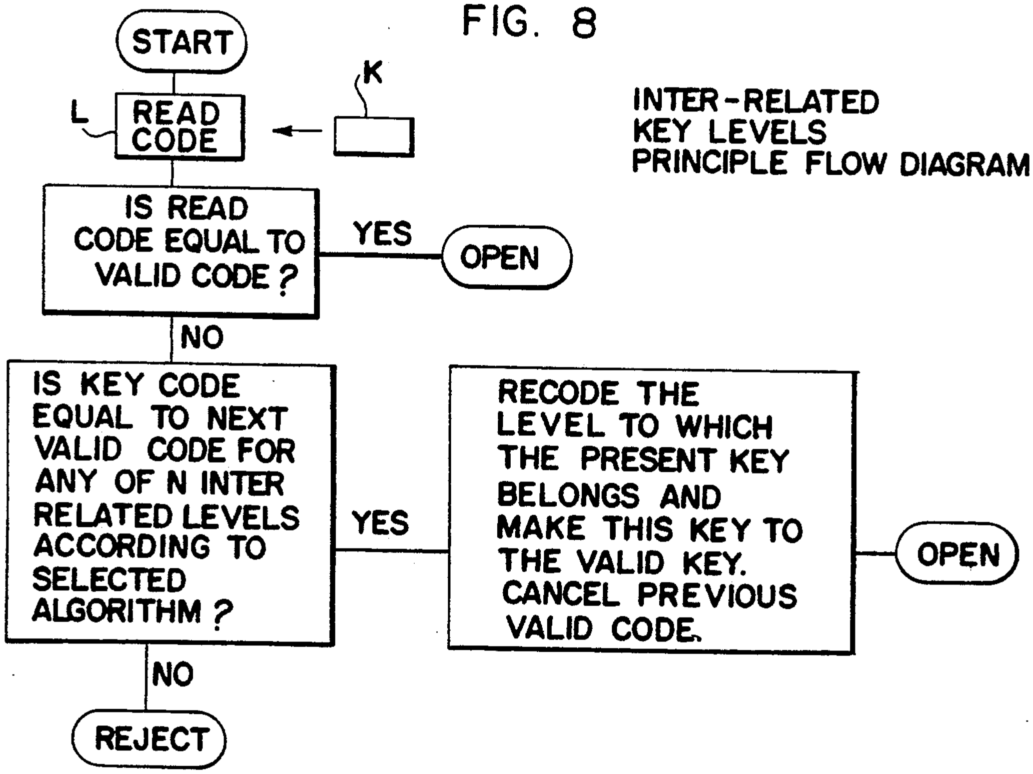
INTER-RELATED KEY LEVELS PRINCIPLE FLOW DIAGRAM

ELECTRONIC LOCK

FIELD OF THE INVENTION

The present invention relates to an electronic lock unit of the type in which a sequence of key codes which allow for the opening of the lock are coded into the lock by means of key media which are adapted to be inserted into the lock. They key media carry key codes assigned by a key coding machine. The lock unit upon receipt of a key medium carrying an acceptable code of the sequence, allows the unlocking of the lock unit, whilst simultaneously cancelling a previously used code of a key medium and making the new key code the valid code.

Particularly, but not exclusively, the invention finds application in connection with hotels, business buildings, etc., where due to security reasons, it is desirable to enable a frequent change in lock combinations, so as to avoid unauthorized opening of the locks involved.

More particularly, the present invention finds application in connection with keys for hotels, wherein keys can be issued not only from a single central location, but from a plurality of locations, for example a railway station, an airport, a ferry station, etc., where a representative of a specific hotel, at any of these locations remote from the hotel, can deliver a key for a vacant room in the hotel.

Further, the invention finds application in connection with passenger ferries where keys are issued at various ferry stations and possibly on board the ferry.

PRIOR ART

From U.S. Pat. No. 4,562,343 (Wiik et al) there is known a recodable electronic lock of the type where the lock is recoded by accepting a new valid key element while a preceding key element is simultaneously cancelled, the recodable electronic lock being of the type in which the lock is coded by means of the key medium which is inserted into the lock, and which carries recoding information, the electronic lock being adapted to accept recoding to any code member in a series of code members, which is valid until a new, previously not utilized code member in the series is introduced, whereupon the lock is automatically recoded to the new code and the previously employed code member or code members are made unacceptable. The lock can also be recoded to accept a new series of code members by using a new appropriately coded recoding member containing readable information about the different code members in the new series. The potentially valid code member series is stored in a memory unit in the lock.

The prior art distinguishes between on-line and off-line electronic locks. The on-line type is connected to a central control unit or a computer unit which governs the locks based on information from the locks, and possibly other information from an operation terminal or similar device. This system makes it possible to centrally store all valid key codes and identify each key.

The off-line type of electronic locks consist of independent units. They can possible co-operate with a key making machine which contains information about which codes are valid for the various locks. An off-line lock will normally be recodable by means of direct operation of the lock.

U.S. Pat. No. 4,562,343 is aimed at providing an off-line type electronic lock, which in a simple way can be instructed for recoding codes independent of a previously determined sequence of codes and keys, and without being dependent upon a central code memory. This is achieved according to the prior art by having a "stack" of key cards for each room in the hotel at the reception desk, the "stack" containing cards which in turn carry individual card key codes in a series or sequence of allowable and potentially allowable key codes. Thus, only if a card in the respective "stack" of key cards is used, the room in question can be opened. When a fresh card of the stack is used, a previously used key card is rejected, whilst simultaneously the code of the fresh key card is established as the valid code in the sequence of key codes or "stack" of codes. However, the off-line electronic lock unit disclosed in U.S. Pat. No. 4,562,343 does not enable the handling of more than one "stack" of card codes, which would not be satisfactory for many businesses, for example the issuance of keys for a passenger ferry, where the passengers can receive keys for their individual cabins not only at a first ferry station and a second ferry station, but also on board the ferry.

Neither would the known electronic lock system according to U.S. Pat. No. 4,562,343 enable an updating of where the last used key was issued, which may be of interest in case a suspicion should arise about the issuance of false keys, or in case a fault in a lock or in a key needs to be traced.

U.S. Pat. No. 4,646,080 (Genest et al.) suggests key means and locks which are programmable to accept key means coded with sequences of codes unique to one or more locks. The locks are reprogrammable by selected key means to exclude other present or past key means from accessing the lock. The prior art system includes a central console which generates and stores all of the combination information codes, identification information codes, function information codes and operation select information codes required for each of a plurality of locks. Further, each lock stores an identification information code and a combination information code for each of a plurality of memory levels in the lock. The coded keys to be used in the system may be encoded in any of a number of different ways, either by the central console or by some external coding mechanism which co-operates with the central console, so that data stored on a coded key for a particular lock will correspond to the data stored in the central console for that particular lock.

However, the memory levels provided for in each lock are related to a hierarchical key system, a first level being for a "master" key common to all locks in a hotel, whereas a second level refers to a group of rooms, and finally a third level referring to an identification information code and a combination information code which is unique to that lock. Thus, this prior art does not give any instructions for providing a lock unit which is adapted to accept key means from a plurality of mutually independent code sequence, i.e. a plurality of mutually independent, but mutually overruling key code levels, each of which is assigned a specific key code sequence, and being related to separate key issuance locations.

U.S. Pat. No. 4,392,133 (Lundgren) suggests both key means and locks programmably controlled to allow given key means access to the lock. The locks are programmed with what could be termed "look-ahead" or "future" codes, allowing for key means being issued and reissued in the event of lost key means. The means for lock and key programming include computer and memory means, but the key code is changed only when putting the new key means into the lock sequentially after the master key. Accordingly, this system cannot be designed as a self-supporting system, or autonomous system in which the card holder by means of only one valid key card or key means will enable unlocking as well as recoding of the lock in question.

Further, U.S. Pat. No. 3,845,361 (Watase et al), U.S. Pat. No. 4,511,946 (McGahan) and U.S. Pat. No. 4,596,985 (Bongard et al) relate to key means and locks operable and responsive to programmable code sequences, but give no instructions for handling a plurality of different, active key code levels, each of which being assigned a specific key code sequence containing a number of shiftable code elements, so as to cater for coding of keys at different locations, the key code levels being mutually independent, but mutually overruling depending on the valid key in question and the sequential relation of the key in relation to previously used keys from any location.

OBJECTS OF THE INVENTION

An object of the present invention to provide an electronic lock for businesses, such as in passenger ferries or hotels that provide cabin locks or guest room locks, which can be automatically re-coded, preferably by means of the key means issued to the guest.

Another object of the present invention is to provide an electronic lock unit in which key means can be issued independent of a common key coding machine.

A further object of the present invention is to provide a system which allows the issuance of keys from different places which are geographically apart, the issued keys being assigned a key code level, and each of which contains a specific key code sequence, which in turn contains a plurality of shiftable code elements.

Yet another object of the present invention is to provide an electronic lock unit which is adapted to accept key means issued from two or more different locations, for example the point of departure of a ferry, its place of destination and on board the ferry, or possibly from an additional number of quay calling locations for the ferry.

Still another object of the present invention is to provide an electronic lock unit to which keys or key media may be issued from various locations, said locations being associated with mutually different key code levels, the issuance procedure at each location being independent of data communication between the locations in question.

Yet another object of the present invention is to provide an electronic lock having new fields of application, i.e. a field of application not only applicable in connection with ordinary hotel room service, but also fields of application relating to passenger ferry operations, and further to the issuance of key means for hotels, where several keys issuing locations are present, for example a railway station, an airport, a ferry quay, etc., the individual representatives of a specific hotel at each location being able to issue a key for a vacant room at the hotel in question.

A main object of the present invention is to give instruction for an autonomous electronic lock unit comprising means for calculating and processing a plurality of futher mutually independent, but mutually overruling key code levels, each of which has been assigned a specific code sequence or key medium sequence of shiftable code elements.

A further main object of the present invention is to provide means for calculating and storing a number of different, active code levels, the means being adapted to accept only one key medium from one of the said different levels as a valid key medium.

SUMMARY OF THE INVENTION

The above objects are achieved in an electronic lock unit of the type in which a sequence of key codes that allow for the opening of a lock are coded into the lock by a key media inserted into the lock, the lock unit further comprising means for calculating and storing one or more further mutually independent, but mutually overruling key code levels, each of which is assigned a specific key code sequence (key medium sequence), which in turn contains a plurality of shiftable code elements.

The calcutating and storing means are adapted to handle N different, active key code levels, and are simultaneously adapted to accept only one key medium relating to one of the N levels, as a valid key medium at a time.

The calculating and storing means will upon receipt of a key medium acceptable for unlocking the lock, check whether one or more of a plurality of potentially acceptable codes included in the available code sequences are carried by the key medium in question. The calculating and storing means will, upon the first time use of the code in any of the code sequence, carry out the following steps:

a) invalidate the hitherto acceptable code, independent of the level to which it belonged, and b) make the present code on the acceptable key medium a new valid code in the code level and code sequence in question.

More specifically, the calculating and storing means will, upon the generation of a "next" or subsequently valid code in a code level, store the subsequent code as the "last" code in the associated but shifted code sequence on the code level to which the key medium in question belongs. This will be the case not only for the code level in question, but prossibly also for a different previously used code level.

Accordingly, the calculating and storing means must be adapted to generate and process a number of code elements which is at least equal to the product of the number of code levels involved and the number of code sequences of code elements.

It is to be understood that the number of code levels can vary, as well as the number of code sequences and code elements.

BRIEF DESCRIPTION OF THE DRAWINGS

A complete understanding of the present invention and the above objects and other advantages thereof may be gained from a consideration of the following detailed description taken in conjunction with the accompanying drawings in which:

FIGS. 7A–7D is an art schematic diagram illustrating the generation of various code levels;

FIG. 8 is a simplified flow diagram illustrating a principle of inter-related key code levels;

DETAILED DESCRIPTION

Figure 1:
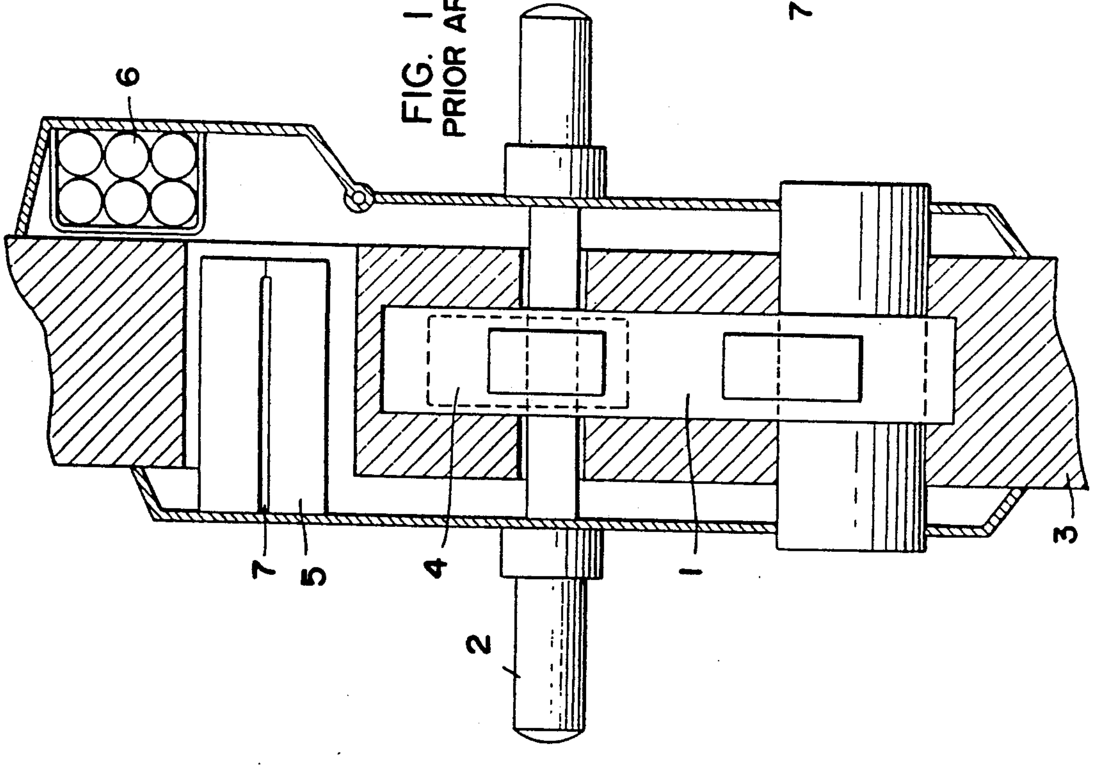
FIG. 1 PRIOR ART
FIG. 1 is a vertical section through a door with an embodiment of an electronic lock mounted therein.

In FIG. 1 the mechanical part of a lock which is a traditional, previously known lock, is indicated by 1. Lever 2 on the outer side of the door 3 is also of a traditionally known type. The mechanism of the lever contains, however, a blocking member 4 which can be disengaged by an electrical pulse which triggers an electromagnet, and which is initiated by an electronic governing unit 5 when the latter responds to an acceptable key medium. In the absence of this pulse the lever will be locked, and the blocking member 4 can then only be operated by means of the cylinder lock. The lever can also be disengaged and engaged by means of a magnetic clutch. The blocking member 4 and the electronic governing unit 5 are supplied with energy from a current source 6 which can consist of batteries. 7 indicates the slot into which a key medium, for example a key card, can be inserted when the lock is to be operated.

Figure 2:
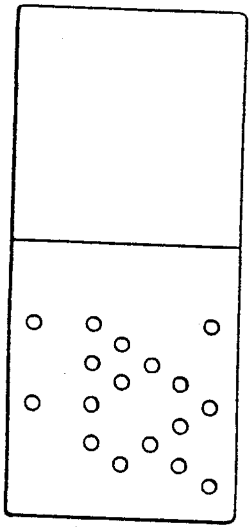
FIG. 2 PRIOR ART
FIG. 2 illustrates a non-limiting embodiment of a card medium in the form of a card.

The key card in FIG. 2 is, for example, made of a plate-shaped material, the code being given by a pattern of holes. The key card contains principally a plurality of, for instance, 32 binary code points which can be coded mechanically, electrically, magnetically or in other ways. The binary code points are here assumed to be divided into at least two zones, for example a room code and a sequence code with an arbitrary location, and yet another zone associated with the location at which the card was issued, as this will be explained in further detail below.

Figure 3:
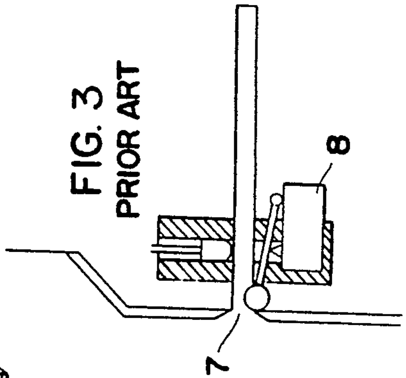
FIG. 3 PRIOR ART
FIGS. 3 and 4 are sections through the reader of the lock illustrated in FIG. 1.
Figure 4:
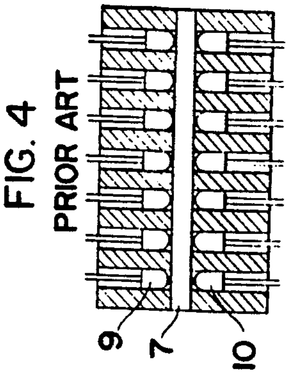
FIG. 4 PRIOR ART

FIGS. 3 and 4 show, as mentioned, a section through the reader of the lock. When the key card is inserted into the slot 7 it will first activate a switch 8, which in turn will initiate a supply of current to a part of an electronic unit which is not supplied continuously. The leading end of the card will then be read as the card is gradually inserted.

FIG. 4 shows a key reading system using photo transistors 9 and optical diodes 10. However, it is to be understood that other available reading systems can be used, for example, magnetic bar codes.

Figure 5:
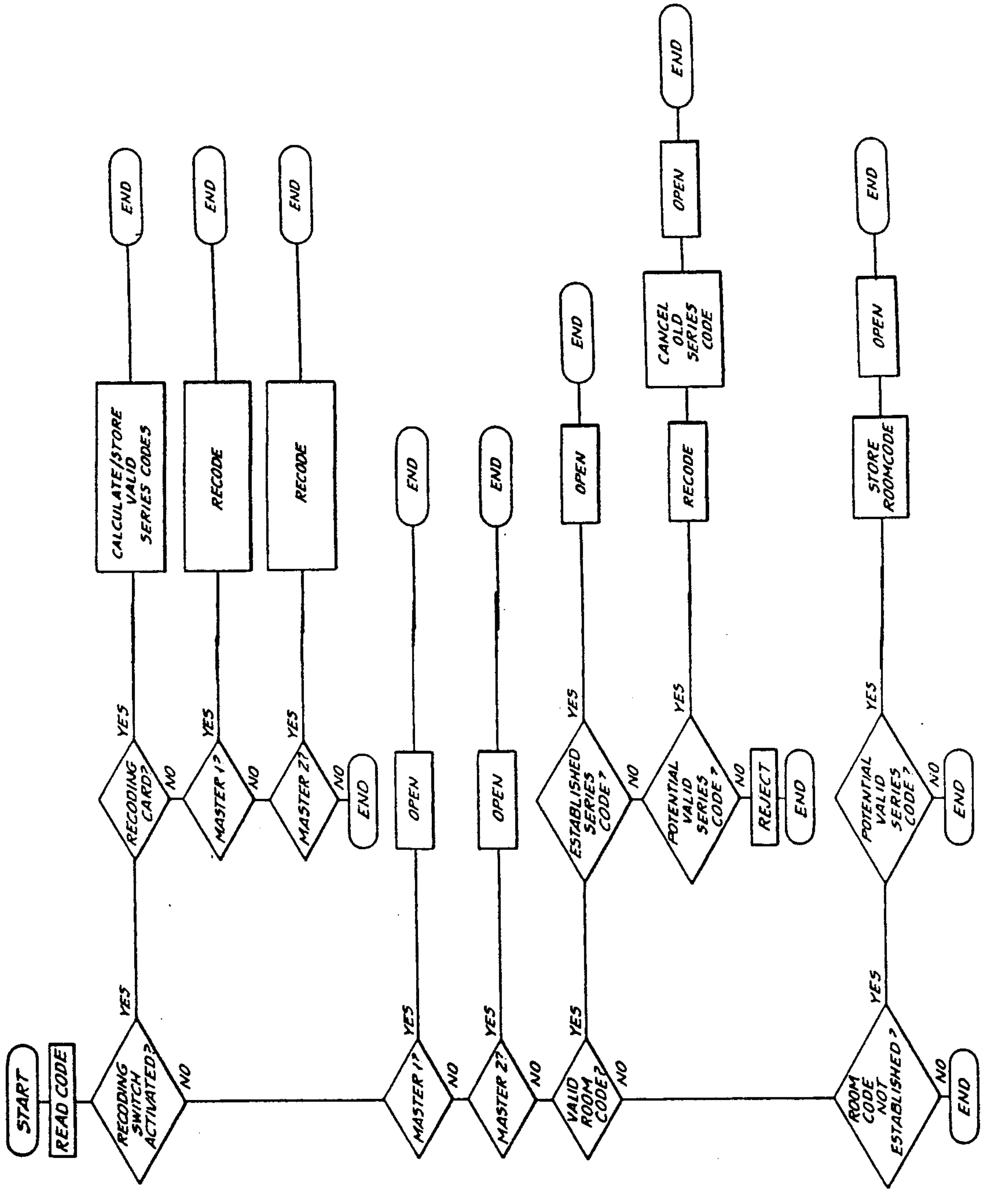
FIG. 5 PRIOR ART
FIG. 5 is a flow diagram illustrating the operation of an embodiment of an electronic lock.

FIG. 5 illustrates a flow diagram for recoding the lock to establish the series code in the memory of the lock for that series of key members which are to be used. As described hereinabove, the recoding in this non-limiting embodiment is carried out by means of a recoding member that supplies information to the lock by means of a pattern of punched holes. However, recoding may be carried out mechanically, electrically, magnetically or in any other conventional manner as for example by the typical electronic circuitry shown in FIG. 6.

Figure 6:
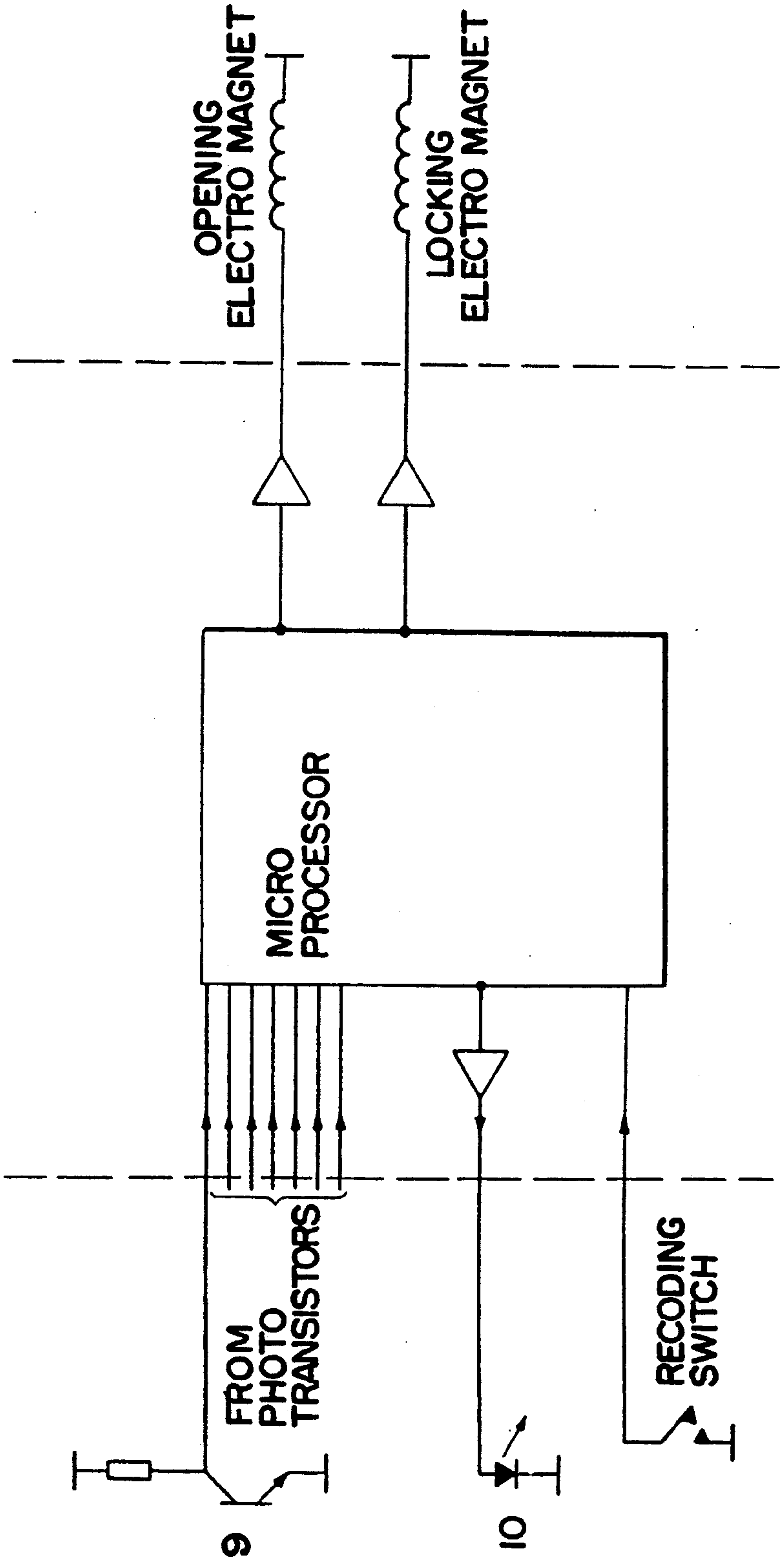
FIG. 6 is a block diagram of an embodiment of an electronic circuitry which can be used for a lock according to the invention.

As shown in FIG. 6, a conventional micro-processor is used for generating a list of valid series codes. More specifically, there may be 7 reader I/O ports, each being connected to one phototransistor 9 in a reader module 10. There is one transmit I/O port connected to the LED in the reader module and one recording I/O port to sense the recording switch, which upon activation will set the electronics for accepting encoding by the recoding member. There are two lock and unlock I/O ports which activate the locking electromagnet and the opening electromagnet, both being located in the lock case.

The description so far is related to a prior art electronic lock system, especially as disclosed in applicant's U.S. Pat. No. 4,562,343 (Wiik et al). However, the present invention finds specific application in connection with the issuance of keys from different, geographically scattered locations, for example in connection with ferries or cruise ships. Further, it is to be understood that the invention also finds application in other relations, wherein the generation of keys or key media can take place at different places, for example not only at ferry quays, but also at railway stations, tourist centres, airports, etc., all of which are co-operated and related to an autonomous electronic lock unit which is to be operated by a customer who arrives at the cabin on a ferry or at the guest room in a hotel via an arbitrary check-in port.

In the following, the invention will be disclosed in connection with a physically operative system associated with a ferry, wherein each cabin has a door comprising an intelligent electronic lock which is able to read a key code carried by an appropriate key medium, and which is un-locked for allowing entrance through the door after having scanned and approved an acceptable code on the key medium. The keys or key media can be generated with different information on the key depending on the location of the key generator unit.

In connection with FIG. 7, the key generator A will be at ferry quay A, the key generator B will be at ferry quay B, whereas key generator C is on board the ferry. It is to be understood that the key generators A, B, C could be located at for example a ferry quay, an airport and a railway station, respectively, as illustrated at the top of the Figure.

It is obvious that the key generator stations A, B and C can hardly operate in synchronism over a long period of time without communication therebetween. Accordingly, there are in the autonomous electronic lock unit according to the invention provided means for calculating and storing information, which enable the lock to recall which station has issued the key in question, and the lock will as a consequence thereof be able to respond accordingly without communication between the various key generator stations.

This means that if a lock in FIG. 7 is adapted to calculate and store three inter-related code levels (N=3), that is n1, n2 and n3, then each of the three levels will be related to or develop separate, mutually independent code sequences, but only the last accepted key medium will at any time establish and represent the presently valid key. However, if another key, different from the previous one, is inserted in the lock, the next key carrying the next acceptable code for any of the three levels (n1, n2 or n3), then the key unit will be recoded and the presently "next" key will be the valid one, it being understood that any previously valid code is invalidated and replaced in any sequence of future acceptable code sequences involved at any level.

Thus, if at any time key codes A1, B2 and C3 which are the codes in question for levels n1, n2 and n3, respectively, but A1 was the last level which was recoded in the lock, then the key having the code A1 will enable unlocking of the lock.

When inserting the next valid code of sequence B (here designated B3) in the lock, the key medium carrying the code element A1 of level A in the associated key code sequence will no longer be accepted by the lock, because it is always the last, acceptable and recodable key here B3, which will be the valid key, with the previous valid, here element A1, being shifted out of the system as the next key medium, here B3, is inserted into the lock.

It should be noted that the principle of inter-related key levels is not dependent upon the algorithm of the code sequence which has been chosen for the generation of valid key media.

FIG. 8 illustrates the main principle of the mutually independent, but mutually over-ruling key code levels, each of which is assigned a special code sequence, or key medium sequence. Here, the autonomous electronic lock unit is designated by L, whereas the key medium which is to be inserted in the lock L, is designated by K.

The flow diagram in FIG. 8 is in many ways comparable with the flow diagram of FIG. 5, and both flow diagrams are applicable to an electronic lock unit of the type in which the sequence of key codes allowing for the opening of the lock is coded into the lock by means of key media K which are adapted to be inserted into the lock L, and which carry key codes assigned to each key medium by one or more key coding machines. The lock unit L will, upon receipt of a key medium K carrying an acceptable code of the sequence, allow unlocking of the lock unit L, whilst simultaneously cancelling a previously used code of a key medium, and will establish the new key code as the valid code. However, in the flow diagram of FIG. 8 the lock unit further comprises means for calculating and processing and storing not only a single code sequence, but means for calculating, processing and storing two or more further mutually independent, but mutually over-ruling key code levels, each of the inter-related levels being assigned a specific key code sequence (key medium sequence), which in turn contains a plurality of shiftable code elements.

In connection with the electronic lock system as illustrated in FIG. 7, there is by means of the principle as generally depicted by means of the flow diagram of FIG. 8, provided a favourable, inexpensive solution for generating key media at different locations, but nevertheless allowing the key media to be used for the same cabin door or hotel room door, without having to establish data communication between the geographically separated card medium generator stations.

The electronic lock unit according to the invention is adapted to accept key means from a number of mutually independent code sequence, wherein only one key means from one of the code levels are valid a time. The lock unit is further adapted to make the previously valid key means invalid when a new key means carrying an arbitrary one of the code sequences is used for the first time, the new key means itself being valid for the opening of the lock unit. In other words, the lock unit according to the present invention is able to calculate and process a number of successive, potentially valid codes in the code sequence, which is enabled by the introduction of a new key means in the locking unit, the calculating and storing means then being designed with a capacity of processing the number of code elements corresponding at least to a product of the number of code levels and the number of key code sequences associated therewith, respectively, it being understood that each key code sequence contains a plurality of shiftable code elements, i.e. successive, potentially valid code elements as discussed above.

Figure 9:
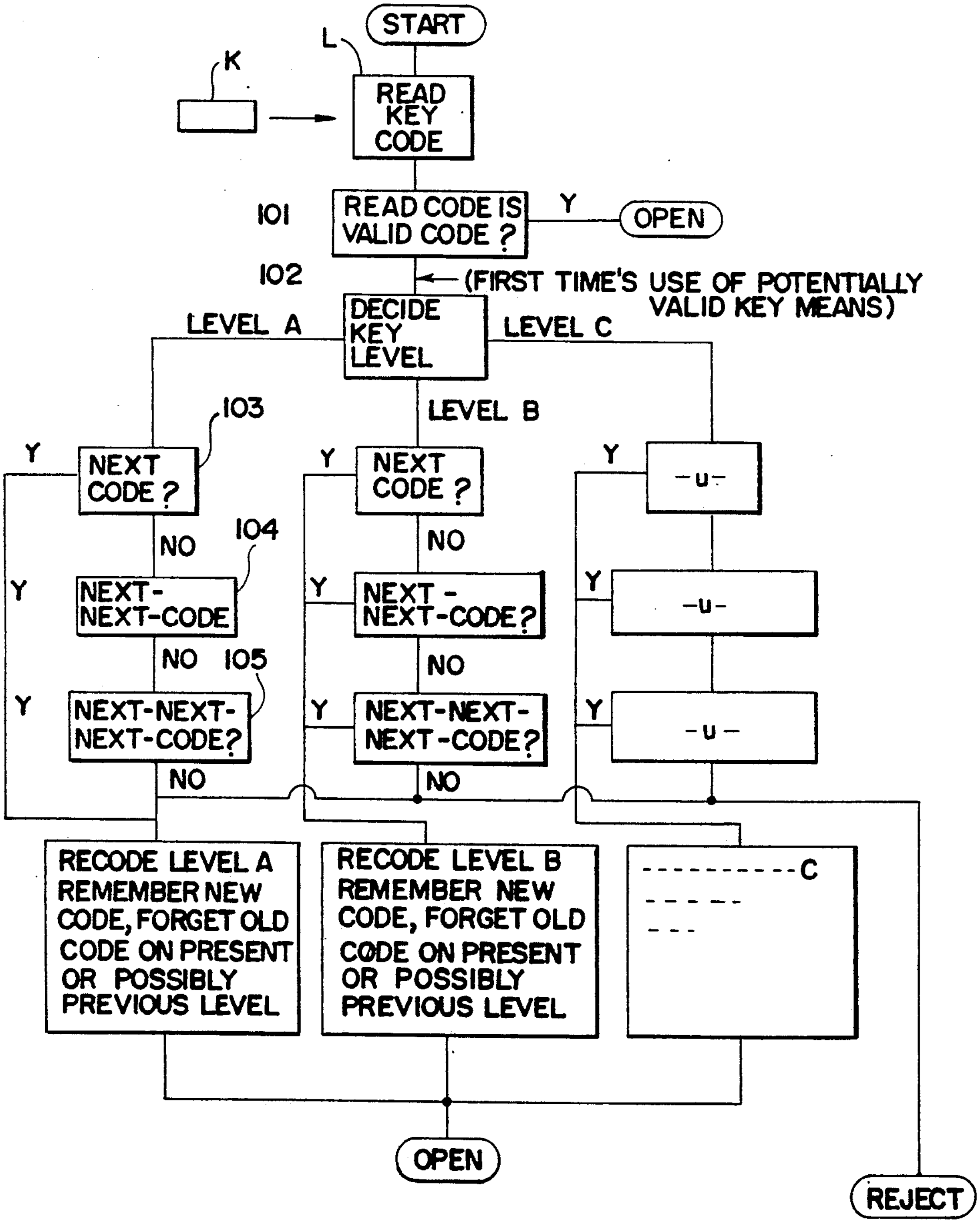
FIG. 9 is an amplified flow diagram illustrating the mutual co-operation of the inter-related key code levels.

In FIG. 9 the same reference designations are used for the lock L and the key K, the enlarged flow diagram here giving a further elucidation of the various evaluations which have to be done by the calculating and storing means in the electronic lock, when being introduced to the various key means associated with the various key generator stations. It is to be understood that the flow diagram of FIG. 9 is associated with an embodiment wherein there is used three inter-related levels N, each level N comprising a code sequence C which in the present embodiment at any time will comprise three individual, acceptable but shiftable code elements.

The calculating and storing means according to the present invention will upon receipt of a key means, which is acceptable for unlocking the lock, check whether one or more of a plurality of potentially acceptable code elements are included in the available code sequences C, i.e. are carried by the key medium in question. In case the read code is the presently accepted code, an immediate opening of the lock will take place, and no recoding will be necessary in the lock itself. This is the situation in block 101 in FIG. 9, the answer here being yes and entailing opening of the lock.

If, however, a potentially valid key means is used in the lock for the first time, i.e. a key means carrying an acceptable code element in an acceptable code sequence related to an acceptable code level, the electronic key lock according to the invention will pass the information on to block 102 in FIG. 9, in which it is decided which level the key means belongs to, i.e. level A, level B or level C. When this has been checked the electronic lock will evaluate whether the selected code level contains a code sequence comprising potentially acceptable code members on the key means, it being understood that each individual code sequence may comprise three successive, potentially valid code elements, these code elements in FIG. 9 being designated as indicated.

Thus, the designations for the three successive, potentially valid code elements are as follows: "next code element", "next-next code element" and "next-next-next code element", as is designated, for level A by way of example, by respectively, in FIG. 9.

If none of these code levels coincide with the code levels of the code sequence related to level A, the key means will be rejected. However, if this key means to be used for the first time is accepted by the electronic lock, i.e. it carries a code element complying with any of the three individual, acceptable code elements of blocks 103, 104, 105 of FIG. 9, then the electronic lock will be released and allow for opening of the door. The hitherto valid code element will then be invalidated independent of the level to which it belonged, and the present code on the acceptable key means will be established as a new valid code at the subject code level and in the code sequence in question, whilst simultaneously enabling the calculation of a subsequently valid code member within the code level, i.e. a shifted associated code sequence.

Thus, the logic system of the lock unit with its calculating and storing means can establish several mutually independent, but internally overruling key code levels, and each such level is assigned a special code sequence (key sequence). A number N of such different, active key sequences can each develop themselves according to previously known principles, for example in that a presently valid code can result in the calculation and storing of a next possible valid code in the locking unit, possible according to another development principle. The lock unit will, however, never accept more than one key means, for example one card from one of the N sequences, as a valid card.

For the calculation of the code there is used an algorithm which allows the locking unit to calculate the potentially valid code, not only for the "immediate" next key card within a key code sequence of a key code level, but also for the "next+1", "next+2", etc. up to "next +P−1", that is for a total of P successively following key cards, but within each sequence. Normally P=3 would be a sufficient number. A locking unit which can "look into the future" in this manner, might accept forward jumps in the code sequence. The reason for this necessity is that an issued key or card can be lost before it is used for the first time. The locking unit will then, without problem, accept a next issued card in the same sequence, and at any code level.

When initiated, the logic system will "see", i.e. will be able to calculate a number of N·P possible codes, and when one such code is used for the first time, it will establish (mark) itself as the presently valid code.

On subsequent use of any of the always available (N·P) possible combinations from any of the N key levels, the logic system will:

1) make the presently valid code invalid,
2) establish the used and accepted code as a new valid code.

Among the N·P possible codes which the locking unit "sees", i.e. which it can calculate, will then be:

a) the (P) next in the development or shift of the key code sequence of which the current key code element belongs, and
b) the (N−1)·P other new code elements of key code sequences associated with the N−1 other key code levels.

It should be noted that the new code elements to be accepted by the lock need not be "stored" in the lock, i.e. do need to be stored by physical elements such as shift registers, as this would occupy too much space. Most appropriately the logic system comprising the calculating and "storing" unit, will also comprise a generator and a counter as well as a comparator unit, so as to sequentially scan through the allowable code elements on all levels as they are generated in accordance with the algortihm, and so as to make an appropriate step in the sequence when a new code is called for.

Figure 10:
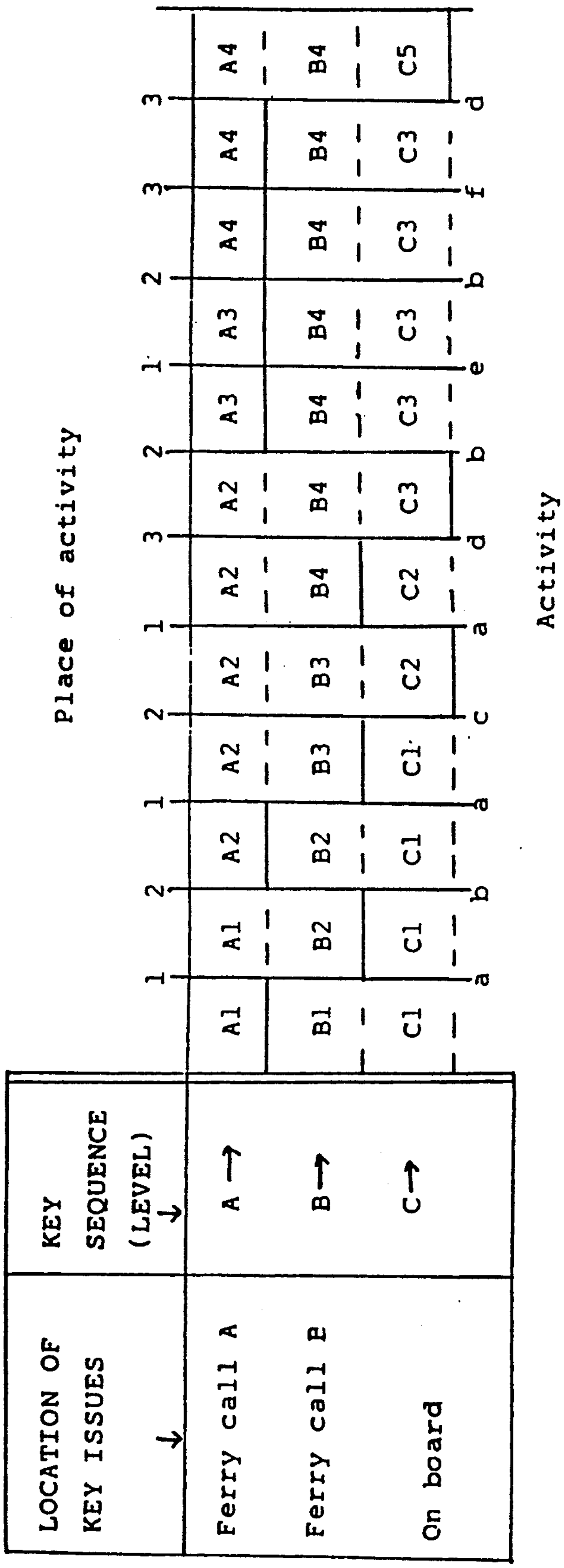
FIG. 10 is a table illustrating the operation of the present lock unit installed in a cabin door of a passenger ferry.

To make the mode of operation of the lock unit according to the present invention more realistic, there will now by means of the table on FIG. 10 be illustrated a possible development of the situation in connection with a passenger ferry calling two ferry stations. Accordingly, in this connection N=3, and P be selected equal to 3, which corresponds to the flow diagram of FIG. 9.

It appears from the table that a locking unit designed according to the present invention would solve most of the possible problems occuring in connection with the cabin locks of such ferries. The key issuing locations operate fully independent of each other and generate new key means or key cards only for its own key code level. For every cabin lock, any new card which is issued from any of the three places of issue would be accepted as a valid card by the locking unit, and the previously valid card would be invalidated.

Thus, the present invention allows for a key system comprising electronic lock units, each of which can receive instructions from two or more independent key generator stations, without being interferred as regards sequence level.

For example, in connection with a ferry travelling between Oslo and Kiel, it would be possible to issue keys in Oslo. When these keys are inserted in the lock of the appropriate cabin, they will invalidate the keys generated in Kiel, and vise versa. In other words, the electronic lock unit comprises two or more key code levels which have embedded therein identifiable points of likeness, as regards their individual key code levels, but wherein each key code level is assigned a specific key code sequence.

It is further understood that the number of code elements can be varied within wide limits, which can also be the case for the number of sequentially arranged code elements, and not at least the number of code levels.

It should also be understood that the shifting of code elements, when developing a new code sequence upon the use of a new card means for the first time, can also be varied, the shifting taking place in accordance with a given program. This program could allow for the shifting to be in accordance with the principle of a shift register, which would involve that all previously used or non-used code elements having a "shift" position being "prior" to the new code to be used, will be shifted out of the system and thus be made invalid. However, it is also to be understood that the invalidation process can be arranged in various other manners, for example by bringing the invalidated codes into the code generator means, for thereby avoiding that invalidated codes should re-appear as a new, potentially valid code.

Finally, it should be noted that by means of an appropriate recoding member, for example as disclosed in connection with FIG. 5, not only could the individual electronic lock units be recoded to for example accept another set of key code levels, but also the key code generator stations could be recoded accordingly, which could be the case if the ferry is sold to another company and a fresh electronic lock system should be introduced.

As regards the reading means included in the electronic locks, it should be noted that these could comprise not only photo transistors, but also means for reading magnetic information, for example bar codes, which have been implemented in the surface of a card means.

I claim:

1. An electronic lock, comprising:

a key having a unique key code, said unique key code being equal to a value defined by an equation N·P, wherein N is equal to a unique key code level, each unique key code level operating on a different code sequence, and P equals a code shift look ahead value for checking a validity of a key that does not currently carry a valid unique key code; and a lock unit for receiving said key, comprising:

means for reading said unique key code on said key;

means for storing key codes in a plurality of independent unique key code levels, said key codes being arranged in a unique key code sequence, with said key code sequence in each level being uniquely defined for each level; and means for comparing said unique key code read from said key with said key codes found in said plurality of key code levels, wherein if said key code on said key is identical to a key code found in said key code sequence in any one of said independent key code levels, said key code in said lock unit is authorized as valid and said lock will open.

2. The electronic lock of claim 1, further comprising a calculating and storing circuit associated with said lock unit that comprises:

means for generating a key code to be stored in one of said independent key code levels, as part of said key code sequence.

3. The electronic lock of claim 2, wherein said generating means and said storing means comprise a generator and a counter, respectively, whereby said key codes of said levels are sequentially produced by said generator and said counter.

4. The electronic lock of claim 2, wherein said calculating and storing circuit comprises a processor.

5. The electronic lock of claim 2, wherein said generating means comprises a microprocessor.

6. The electronic lock of claim 5, wherein said microprocessor stores an algorithm for calculating said unique sequence of key codes for each level.

7. The electronic lock of claim 2, further comprising means for invalidating a previously valid key code, whenever a key received by said reading means contains a valid key code that is different from said previously valid key code, so that said previously valid key code can no longer be used to open said lock.

8. The electronic lock of claim 7, wherein said invalidating means and said generating means comprise a shift register.

9. The electronic lock of claim 7, wherein said generating means produces said sequence of key codes by progressively incrementing said key codes stored in said independent key code levels.

10. The electronic lock of claim 1, wherein said key code of said key contains a code that identifies the level in said plurality of independent key code levels that contains said sequence of key codes that contains said key code corresponding to said key code of said key.

11. The electronic lock of claim 1, wherein said lock unit recognizes only one unique key code for each plurality of independent key code levels.

* * * * *